US007860194B2

(12) United States Patent
Kim et al.

(10) Patent No.: US 7,860,194 B2
(45) Date of Patent: Dec. 28, 2010

(54) METHOD AND APPARATUS FOR NORMALIZING INPUT METRIC TO A CHANNEL DECODER IN A WIRELESS COMMUNICATION SYSTEM

(75) Inventors: Sang-Hyo Kim, Suwon-si (KR); Min-Goo Kim, Yongin-si (KR); Young-Mo Gu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1084 days.

(21) Appl. No.: 11/594,991

(22) Filed: Nov. 9, 2006

(65) Prior Publication Data

US 2007/0110191 A1 May 17, 2007

(30) Foreign Application Priority Data

Nov. 11, 2005 (KR) ............... 10-2005-0108264
Mar. 9, 2006 (KR) ............... 10-2006-0022387

(51) Int. Cl.
*H04L 27/06* (2006.01)

(52) U.S. Cl. ............... 375/341; 375/262; 714/780; 714/795

(58) Field of Classification Search ......... 375/259–262, 375/265, 316, 340–341; 714/699, 746, 752, 714/780, 786, 795

See application file for complete search history.

(56) References Cited

U.S. PATENT DOCUMENTS

| 6,697,443 | B1 | 2/2004 | Kim et al. | |
|---|---|---|---|---|
| 6,871,316 | B1 | 3/2005 | Wong et al. | |
| 6,980,602 | B1 * | 12/2005 | Kleinerman et al. | 375/262 |
| 2002/0122510 | A1 * | 9/2002 | Yakhnich et al. | 375/342 |
| 2005/0069057 | A1 * | 3/2005 | Krupka | 375/340 |
| 2007/0127605 | A1 * | 6/2007 | Sindhushayana | 375/341 |

FOREIGN PATENT DOCUMENTS

| KR | 1999-0079402 | 11/1999 |
|---|---|---|
| WO | WO 03/043201 | 5/2003 |

* cited by examiner

*Primary Examiner*—David C Payne
*Assistant Examiner*—James M Perez
(74) *Attorney, Agent, or Firm*—Roylance, Abrams, Berdo & Goodman, L.L.P.

(57) ABSTRACT

An apparatus and method are provided for normalizing input soft metric to a channel decoder in a wireless communication system. A demapper generates soft metric using an in-phase component ($X_k$) and a quadrature component ($Y_k$) of a received modulated symbol ($R_k$), a channel fading coefficient ($g_k$) and a constant value (c) defined by a modulation order of the received modulated symbol. A normalizer receives the soft metric, computes a normalized log likelihood ratio (LLR) by multiplying the soft metric by a ratio of the constant value to a noise variance value, transforms the normalized LLR into a desired range and a desired number of bits, and outputs an input LLR of the channel decoder.

23 Claims, 14 Drawing Sheets

App. No. 11/594,991
Completion of App. Dated Jan. 30, 2007
Reply to Notice to File Missing Parts of
November 30, 2006
Replacement Drawing

METHOD AND APPARATUS FOR NORMALIZING INPUT METRIC TO A CHANNEL DECODER IN A WIRELESS COMMUNICATION SYSTEM

CROSS-REFERENCE TO RELATED PATENT APPLICATIONS

This application claims priority under 35 U.S.C. §119(a) of Korean Patent Applications Serial Nos. 2005-108264 and 2006-22387, filed in the Korean Industrial Property Office on Nov. 11, 2005 and Mar. 9, 2006, respectively, the entire contents of both of which are hereby incorporated by reference.

BACKGROUND OF THE INVENTION

1. Field of the Invention

The present invention generally relates to a wireless communication system. More particularly, the present invention relates to a method and apparatus for normalizing input metric to a channel decoder.

2. Description of the Related Art

Code division multiple access 2000 (CDMA 2000), wideband-CDMA (WCDMA) and institute of electrical and electronics engineers (IEEE) 802.16 systems perform modulations of quadrature phase shift keying (QPSK), 8PSK, 16-ary quadrature amplitude modulation (16-QAM), 64-ary quadrature amplitude modulation (64-QAM) and so on. Further, these systems perform adaptive modulation and coding (AMC) with a combination of channel codes such as turbo codes. The systems obtain an optimal transmission rate proper for a channel situation. A reception stage computes a log likelihood ratio (LLR) per bit with a demapper according to various modulations and acquires input metric to a channel decoder. The channel decoder receives and decodes the metric.

FIG. 1 illustrates a structure of a transceiver in a conventional wireless communication system.

Referring to FIG. 1, binary data i(n) to be transmitted is encoded in a channel encoder 110 within a transmitter 100. The channel encoder 110 generates a series of binary code symbols c(n). A mapper 120 generates a block of several code symbols of the generated code symbols, performs mapping to one point on a signal constellation, and performs transformation into a modulation symbol x(n) of a complex value. The modulation symbol x(n) is applied to a modulator 130. The modulator 130 generates a continuous-time wave in a code division access multiplexing (CDMA) or orthogonal frequency division multiplexing (OFDM) scheme according to modulation symbol x(n) and transmits the generated wave to a receiver 150 through a channel 140.

In the receiver 150, a demodulator/channel estimator 160 performs baseband demodulation and channel estimation processes for a received signal: The demodulator can be implemented according to various technologies. For example, the demodulator can be an OFDM demodulator implemented with a CDMA Rake receiver or an inverse fast Fourier transform (IFFT) processor and a channel estimator. After the baseband demodulation, a channel estimate c(n) and a received symbol y(n) modulated by QAM or PSK are obtained.

A demapper 170 computes metric of bits constructing a codeword of channel codes using the received symbol y(n) and the channel estimate c(n). A sequence Λ(n) corresponding to a metric value computed in the demapper 170 is input to a channel decoder 180 and is decoded into originally transmitted binary data. When the channel decoder 180 completes the decoding operation, the receiver 150 completes a basic operation in a physical layer. At this time, the channel decoder 180 may use a Viterbi decoder for convolutional codes, a soft output Viterbi algorithm (SOVA) iterative decoder for turbo codes, a log-maximum a posteriori (MAP) iterative decoder, and a max-log-MAP iterative decoder, and so on.

In the implementation of the conventional wireless communication system operating as described above, a dynamic range of metric input to the decoder is not limited when a floating-point operation is conventionally performed. However, when hardware for performing a fixed-point operation is implemented, it is affected by quantization noise, clipping noise, and so on according to dynamic range. Therefore, each step of a communication system should ensure optimal performance with minimal hardware by performing normalization proper for metric representation. However, since the conventional method does not consider normalization of metric computed in a demapper, there is a problem in that the performances of a high code rate and high-order modulation are lower than those of the conventional code rate and modulation.

SUMMARY OF THE INVENTION

Accordingly, certain exemplary embodiments of the present invention address the above and other problems occurring in the prior art. Exemplary aspects of the present invention provide a method and apparatus that can obtain optimal performance in channel decoding with log likelihood ratio (LLR) metric of a small number of bits in a wireless communication system.

Moreover, exemplary embodiments of the present invention provide a method and apparatus that can improve decoding performance with a small number of bits by normalizing metric used as an input of a channel decoder in a wireless communication system.

Moreover, exemplary embodiments of the present invention provide a method and apparatus that can properly normalize metric used as an input of a channel decoder according to modulation order and noise level of a current state in a wireless communication system.

Moreover, exemplary embodiments of the present invention provide a method and apparatus that can perform proper normalization using information about a modulation order, a channel code rate and a channel code frame length when information about noise variance used as an input of a channel decoder is absent in a wireless communication system.

In accordance with an exemplary aspect of the present invention, there is provided an apparatus for normalizing input soft metric to a channel decoder in a wireless communication system. In an exemplary implementation, the apparatus comprises a demapper for generating soft metric using an in-phase component ($X_k$), and a quadrature component ($Y_k$) of a received modulated symbol ($R_k$), a channel fading coefficient ($g_k$) and a constant value (c) defined by a modulation order of the received modulated symbol, and a normalizer for receiving the soft metric, computing a normalized log likelihood ratio (LLR) by multiplying the soft metric by a ratio of the constant value to a noise variance value, transforming the normalized LLR into a desired range and a desired number of bits, and outputting an input LLR of the channel decoder.

In accordance with another exemplary aspect of the present invention, there is provided an apparatus for normalizing input soft metric to a channel decoder in a wireless communication system. In an exemplary implementation, the apparatus comprises a demapper for generating soft metric using an in-phase component ($X_k$) and a quadrature component ($Y_k$) of a received modulated symbol ($R_k$), a channel fading coefficient ($g_k$) and a constant value (c) defined by a modulation order of the received modulated symbol, and a normalizer for receiving the soft metric, computing a normalized log likelihood ratio (LLR) by multiplying the soft metric by a normalization coefficient computed by adaptive modulation and coding (AMC) information, transforming the normalized LLR into a desired range and a desired number of bits, and outputting an input LLR of the channel decoder.

In accordance with another exemplary aspect of the present invention, there is provided a method for normalizing input soft metric to a channel decoder in a wireless communication system. In an exemplary implementation, the method comprises generating soft metric using an in-phase component ($X_k$) and a quadrature component ($Y_k$) of a received modulated symbol ($R_k$), a channel fading coefficient ($g_k$) and a constant value (c) defined by a modulation order of the received modulated symbol, receiving the soft metric and computing a normalized log likelihood ratio (LLR) by multiplying the soft metric by a ratio of the constant value to a noise variance value, and transforming the normalized LLR into a desired range and a desired number of bits and outputting an input LLR of the channel decoder.

In accordance with yet another exemplary aspect of the present invention, there is provided a method for normalizing input soft metric to a channel decoder in a wireless communication system. In an exemplary implementation, the method comprises generating soft metric using an in-phase component ($X_k$) and a quadrature component ($Y_k$) of a received modulated symbol ($R_k$), a channel fading coefficient ($g_k$) and a constant value (c) defined by a modulation order of the received modulated symbol, receiving the soft metric and computing a normalized log likelihood ratio (LLR) by multiplying the soft metric by a normalization coefficient computed by adaptive modulation and coding (AMC) information, and transforming the normalized LLR into a desired range and a desired number of bits and outputting an input LLR of the channel decoder.

BRIEF DESCRIPTION OF THE DRAWINGS

The above and other features and advantages of the present invention will be more clearly understood from the following detailed description taken in conjunction with the accompanying drawings where the same drawing reference numerals will be understood to refer to the same elements, features and structures, in which.

DETAILED DESCRIPTION OF EXEMPLARY EMBODIMENTS

Operation principles of exemplary embodiments of the present invention will be described in detail herein below with reference to the accompanying drawings. In the following description, detailed descriptions of functions and configurations incorporated herein that are well known to those skilled in the art are omitted for clarity and conciseness. It is to be understood that the phraseology and terminology employed herein are for the purpose of description and should not be regarded as limiting the present invention.

Exemplary embodiments of the present invention provide a method and an apparatus for obtaining optimal decoding performance with log likelihood ratio (LLR) metric of a small number of bits when a channel is encoded. Certain exemplary implementations of the present invention facilitate improvement in the decoding performance with a small number of bits by normalizing input metric of a channel decoder.

First Exemplary Embodiment

A first exemplary embodiment of the present invention provides a structure and operation procedure for performing normalization with information about noise variance used as an input of a channel decoder.

Figure 1:
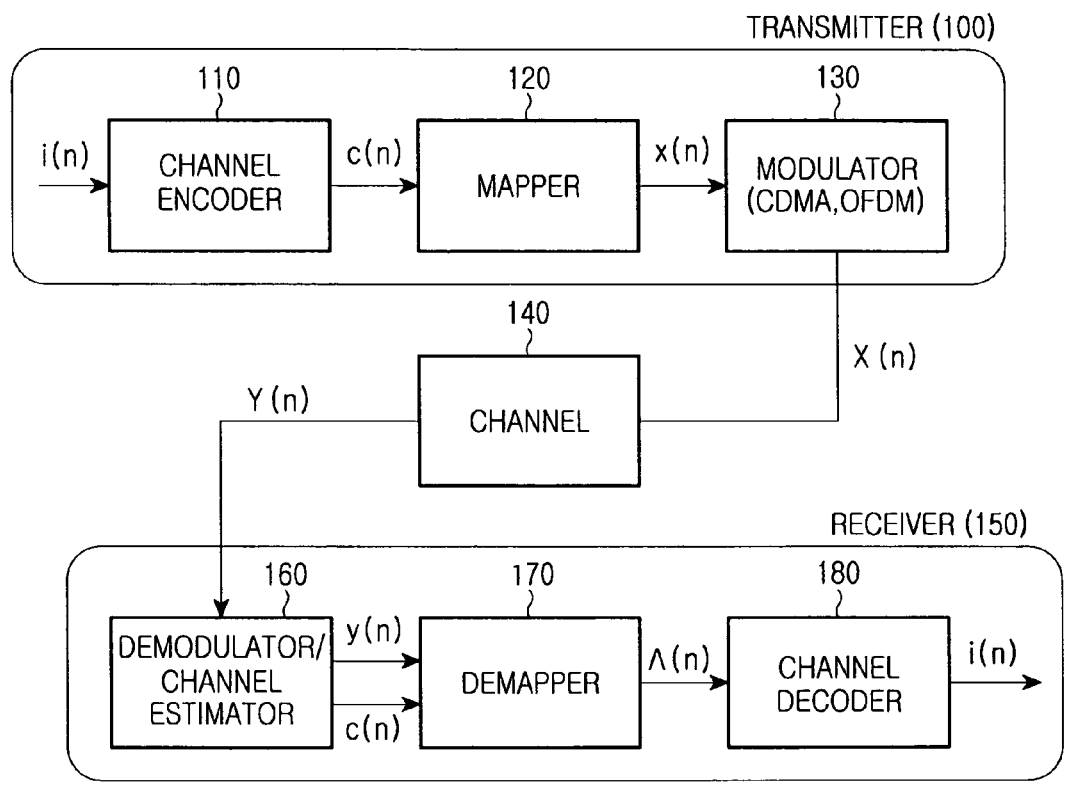
FIG. 1 illustrates a structure of a transceiver in a conventional wireless communication system.
Figure 2:
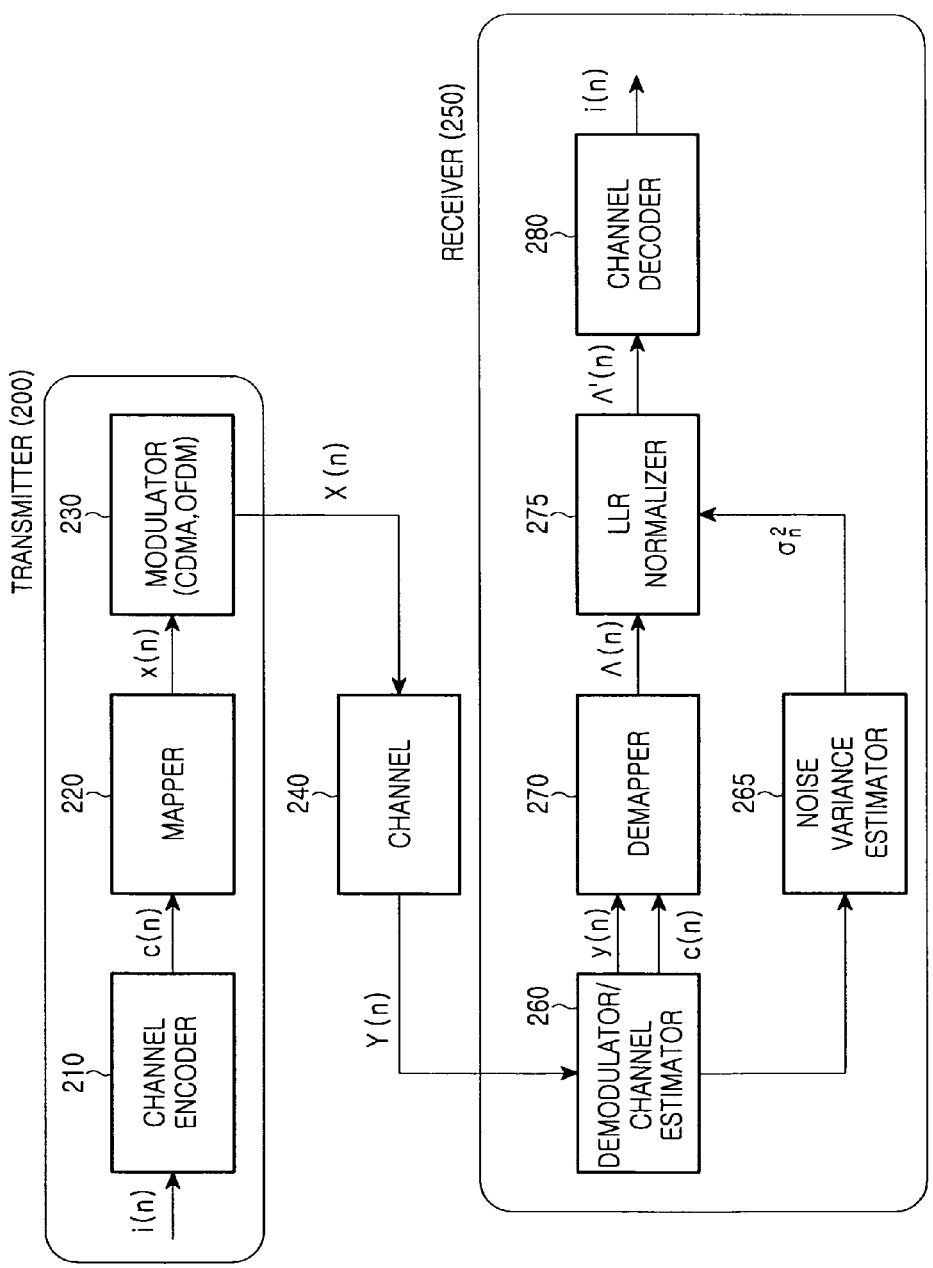
FIG. 2 illustrates a structure of a transceiver to which an input metric normalizer is applied in accordance with a first exemplary embodiment of the present invention.

FIG. 2 illustrates a structure of a wireless communication transceiver to which an input metric normalizer is applied in accordance with a first exemplary embodiment of the present invention.

Referring to FIG. 2, binary data i(n) to be transmitted is encoded in a channel encoder 210 within a transmitter 200. The channel encoder 210 generates a series of binary code symbols c(n). A mapper 220 generates a block of several code symbols of the generated code symbols, performs mapping to one point on a signal constellation, and performs transformation into a modulation symbol x(n) of a complex value. The sequence x(n) is applied to a modulator 230. The modulator 230 generates a continuous-time wave in a code division access multiplexing (CDMA) or orthogonal frequency division multiplexing (OFDM) scheme according to symbol and transmits the generated wave to a receiver 250 through a channel 240.

In the receiver 250, a demodulator/channel estimator 260 performs baseband demodulation and channel estimation processes for a signal passing through the channel 240. The demodulator can be implemented according to technologies applied to a baseband. For example, the demodulator can be an OFDM demodulator implemented with a CDMA Rake receiver or an inverse fast Fourier transform (IFFT) processor and a channel estimator.

In the exemplary embodiment of the present invention, institute of electrical and electronics engineers (IEEE) 802.16e and orthogonal frequency division multiple access (OFDMA) systems will be basically described. After baseband demodulation by the demodulator/channel estimator 260, a received symbol and a channel estimate are output to a noise variance estimator 265 and a demapper 270. The noise variance estimator 265 estimates a noise variance value $\sigma_n^2$ according to channel estimate in various algorithms and outputs the estimated noise variance value to an LLR normalizer 275.

The demapper 270 receives a channel estimate c(n) and a received symbol y(n) modulated by quadrature amplitude modulation (QAM) or phase shift keying (PSK) from the demodulator/channel estimator 260 and outputs metric per bit through demapping. The demapper 270 can acquire the metric using various algorithms. The demapping method conventionally uses a simplified algorithm close to an optimal algorithm. One of various methods is a dual minimum metric method proposed in Reference Literature 1 (Y. Xu, H.-J. Su, E.Geraniotis, "Pilot symbol assisted QAM with interleaved filtering and turbo decoding over Rayleigh flat-fading channel," in Proc. MILCOM '99, pp. 86-91), the disclosure of which is hereby incorporated by reference.

The IEEE 802.16e system uses high-order modulation of 16-ary quadrature amplitude modulation (16-QAM) or 64-ary quadrature amplitude modulation (64-QAM). A signal transmitted after the modulation may be distorted by channel fading and noise. Since a convolutional turbo decoder serving as a channel decoder 280 receives and decodes soft metric corresponding to reliability information of each bit in the receiver 250 of the IEEE 802.16 system, a process for computing the soft metric from the distorted received signal is required in a front stage of the channel decoder 280. This process is performed by the demapper 270 in the receiver 250. Now, a demapping algorithm applicable to the present invention will be described.

The IEEE 802.16 system uses modulation of quadrature phase shift keying (QPSK), 16QAM or 64QAM. When the number of bits for representing one modulation symbol in an output sequence of a binary channel encoder is m, the number of signal points in a constellation is $M=2^m$, where m=2, 4, 6 and so on. The m bits are mapped to specific signal points of the signal points. When M-QAM mapping is expressed by an equation, in-phase and quadrature components of modulation symbols can be acquired from m binary symbols as shown in Equation (1).

$$s_{k,m-1}, s_{k,m-2}, \ldots, s_{k,0} \xrightarrow{M\text{-}QAM} x_k, y_k \quad (1)$$

In Equation (1), $s_{k,j}$ (i=0,1,...,m-1) is an i-th symbol of an output sequence of a binary channel encoder mapped to a k-th signal point. $x_k$ and $y_k$ are an in-phase component and a quadrature component of the k-th signal point, respectively. In the case of 16QAM, m=4.

Figure 3A:
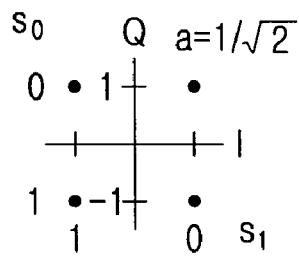
FIG. 3A illustrates a quadrature phase shift keying (QPSK) constellation and mapping.
Figure 3B:
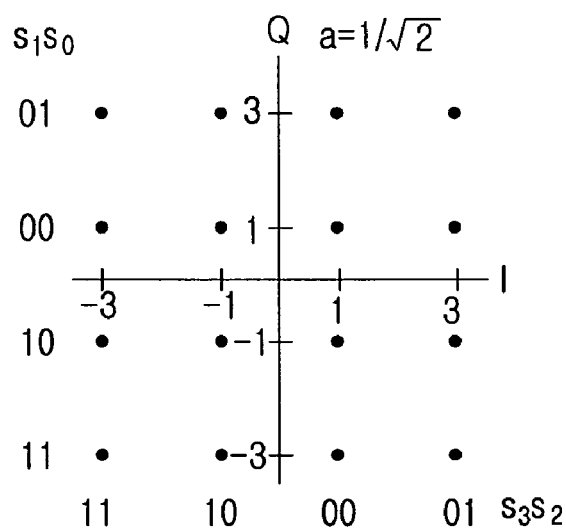
FIG. 3B illustrates a 16-ary quadrature amplitude modulation (16-QAM) constellation and mapping.
Figure 3C:
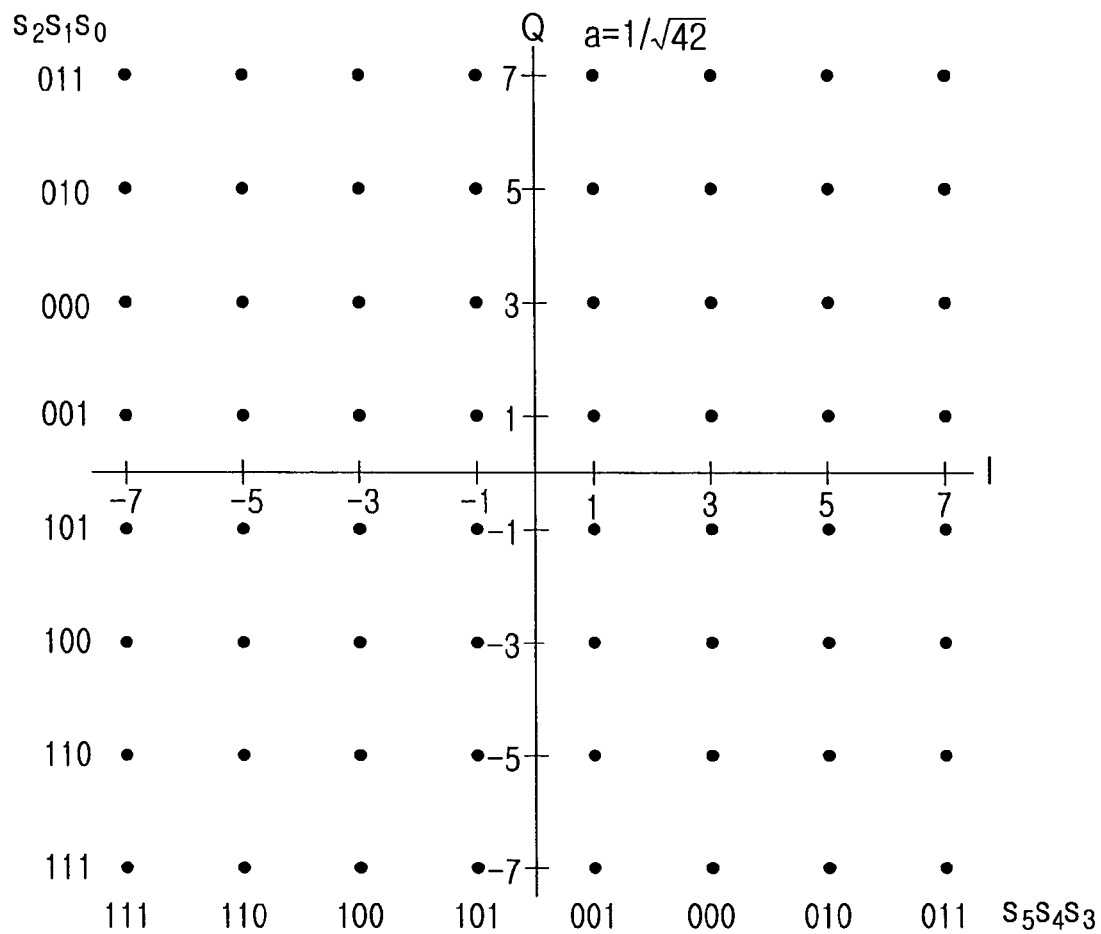
FIG. 3C illustrates a 64-ary quadrature amplitude modulation (64-QAM) constellation and mapping.

FIGS. 3A to 3C illustrate a QPSK constellation, a 16QAM constellation and a 64QAM constellation, respectively.

As seen from FIGS. 3A to 3C, $x_k$ of a symbol to be modulated is determined by $s_{k,m-1}, s_{k,m-2}, \ldots, s_{k,m/2}$ and $y_k$ is determined by $s_{k,m/2-1}, \ldots, s_{k,0}$. A constant c capable of determining each constellation point is defined as shown in Equation (2). This is a value for setting mean energy of the symbol to 1.

$$c_4 = \frac{1}{\sqrt{2}} = 0.70711 \quad (2)$$

$$c_{16} = \frac{1}{\sqrt{10}} = 0.3162$$

$$c_{64} = \frac{1}{\sqrt{42}} = 0.1543$$

Herein, $c_4$ is a reference value of QPSK, $c_{16}$ is a reference value of 16QAM, and $c_{64}$ is a reference value of 64QAM. A modulated symbol has a complex value of $x_k + jy_k$. After the modulated symbol passes through the channel 240 and the baseband demodulator 260, a signal as shown in Equation (3) is input to the demapper 270.

$$R_k = g_k(x_k + jy_k) + n_{xk} + jn_{yk} \quad (3)$$
$$= X_K + jY_K$$

Herein, $g_k$ is a channel fading coefficient and is expressed by $g_k = g_{xk} + jg_{yk}$, $n_{xk}$ and $n_{yk}$ are noise and interference components. A log likelihood ratio (LLR) of a bit symbol $s_{kj}$ corresponding to an element of a QAM symbol can be approximated as shown in Equation (4).

$$\tilde{\Lambda}(s_{k,i}) = \log \frac{Pr\{s_{k,i} = 0 \mid X_k, Y_k\}}{Pr\{s_{k,i} = 1 \mid X_k, Y_k\}} \quad (4)$$

$$= \log \frac{\sum_{z_k} \exp\left\{\frac{-1}{\sigma_n^2} |R_k - z_k(s_{k,i}=0)|^2\right\}}{\sum_{z_k} \exp\left\{\frac{-1}{\sigma_n^2} |R_k - z_k(s_{k,i}=1)|^2\right\}}$$

$$\approx \log \frac{\exp\left\{\frac{-1}{\sigma_n^2} \min |R_k - z_k(s_{k,i}=0)|^2\right\}}{\exp\left\{\frac{-1}{\sigma_n^2} \min |R_k - z_k(s_{k,i}=1)|^2\right\}}$$

$$= \frac{1}{\sigma_n^2}[\min|R_k - z_k(s_{k,i}=1)|^2 - \min|R_k - z_k(s_{k,i}=0)|^2]$$

Herein, $z_k(s_{kj}=0)$ is a changed constellation point computed by multiplying a symbol of $s_{kj}=0$ by the fading constant $g_k$ and $\sigma_n^2$ is the variance of noise and interference.

In Equation (4), a max-log-maximum a posteriori (MAP) scheme is applied to compute the LLR and a high reliable estimate can be obtained using a small amount of computation. Equation (4) can be approximated as shown in Equation (5).

$$\tilde{\Lambda}(s_{k,i}) = \frac{1}{\sigma_n^2}(2n_{k,i} - 1)[|R_k - z_k(s_{k,i} = n_{k,i})|^2 - \min|R_k - z_k(s_{k,i} = \bar{n}_{k,i})|^2] \quad (5)$$

Herein, $n_{kj}$ is an i-th information bit value mapped to a constellation point closet to a received symbol $R_k$, and $\bar{n}_{kj}$ is the negation of $n_{kj}$. Bit symbols $s_{kj}$ constructing QPSK, 16QAM and 64QAM symbols are related only to one of the in-phase and quadrature components of the received symbol, respectively. In relation to $R_k$ and $z_k$ of Equation (5), one of the x and y axis components is eliminated according to $s_{kj}$.

Figure 4:
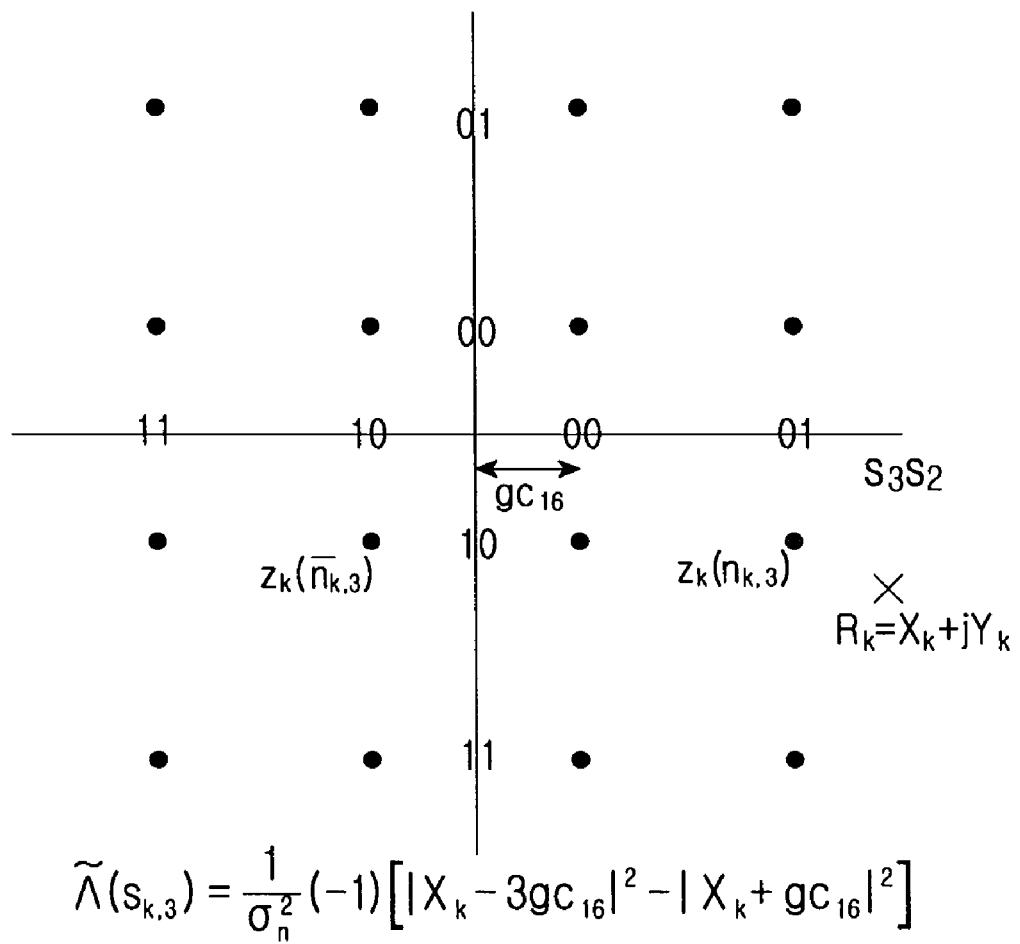
FIG. 4 illustrates an example of computing soft metric.

FIG. 4 illustrates an example of computing an LLR when $g_k$ is a real value.

Assuming that $R_k$ is received, the LLR of $s_3$ can be defined by Equation (6) as illustrated in FIG. 4.

$$\tilde{\Lambda}(s_{k,3}) = \frac{1}{\sigma_n^2}(-1)[|X_k - 3g_k c_{16}|^2 - |X_k + g_k c_{16}|^2] \quad (6)$$

$$= \frac{4c_{16}}{\sigma_n^2}(2|g_k|^2 X_k - 2|g_k|^2 c_{16})$$

When the LLR is computed using a method as shown in Equation (6), a coefficient $$4\frac{c_{16}}{\sigma_n^2}$$

is present in every case and a parenthesized part is a linear equation for an input signal. In an exemplary implementation, the demapper can be implemented with a linear function of a soft metric generator (SMG). After a constant including a fading coefficient $g_k$ is input to the SMG, it can be processed in a proper scaling method. Assuming that a function for generating soft metric by eliminating the coefficient $$4\frac{c_{16}}{\sigma_n^2}$$

from the LLR is SMG(a,b), Equation (6) for computing the LLR can be rewritten as Equation (7).

$$\tilde{\Lambda}(s_{k,i}) = \frac{4c}{\sigma_n^2}SMG_i(|g_k|^2 X_k, |g_k|^2 c) \quad (7)$$

$$= \frac{4c}{\sigma_n^2}\Lambda(s_{k,i})$$

Equation (7) shows the LLR computation related only to the in-phase component $X_k$. Of course, the LLR computation related only to the quadrature component $Y_k$ can use $|g_k|^2 Y_k$ in place of $|g_k|^2 X_k$.

Inputs of the SMG are $|g_k|^2 X_k$, $|g_k|^2 Y_k$ and $|g_k|^2 c$, where $g_k$ is obtained from a channel estimate. Thus, the inputs of the SMG can be easily computed from the received symbol and the channel estimate.

When $g_k$ is complex, the inputs of the SMG mapped to the in-phase signal component and the quadrature signal component are defined as shown in Equation (8).

$$R_k g_k^* = (X_k + jY_k)(g_{xk} - jg_{yk}) \quad (8)$$

$$= (X_k g_{xk} + Y_k g_{yk}) + j(Y_k g_{xk} - X_k g_{yk})$$

$$= |g_k|^2 X_k + j|g_k|^2 Y_k$$

That is, the inputs of the SMG in Equation (8) can be easily computed from the received signal using Equation (9).

$$(X_k g_{xk} + Y_k g_{yk}, |g_k|^2 c) = (I_k, a_k)$$

$$(Y_k g_{xk} - Y_k g_{yk}, |g_k|^2 c) = (Q_k, a_k) \quad (9)$$

In the coefficient $$4\frac{c}{\sigma_n^2}$$

commonly attached between outputs of the SMG, the value of 4 is a common coefficient of QPSK, 16QAM and 64QAM and therefore quantization is reflected.

$$4\frac{c}{\sigma_n^2}$$

is set so that normalization is performed after a soft output is generated and a quantized LLR has a proper range and resolution.

Then, metric to be computed in the demapper 270 can be simplified as shown in Equation (10) and a function of $SMG_i(\ )$ is simple linear computation implemented only with a shift operation and an adder.

$$\Lambda(s_{k,i}) = SMG_i(I_k, a_k) \quad (10)$$

$$= \frac{2n_{k,i} - 1}{4c}[|R_k - z_k(s_{k,i} = n_{k,i})|^2 - \min|R_k - z_k(s_{k,i} = \bar{n}_{k,i})|^2]$$

Herein, $a_k$ is $|g_k|^2 c$. Equation (10) is used to compute the soft metric related to the in-phase component. $SMG_i(Q_k, a_k)$ is used to compute the soft metric related to the quadrature component as shown in Equation (7).

As shown in the following tables, the metric of 16QAM obtained from the function of $SMG_i(\ )$ can be obtained according to domain to which the in-phase signal component $I_k$ and the quadrature signal component $Q_k$ computed from the received symbol and the channel fading coefficient belong. In order to compute the soft metric, only $I_k$, $Q_k$ and $a_k$ are considered.

TABLE 1

| Condition of $I_k$ | $\Lambda(s_{k,3})$ | $\Lambda(s_{k,2})$ |
|---|---|---|
| $I_k > 2a_k$ | $2I_k - 2a_k$ | $2a_k - I_k$ |
| $0 < I_k \leq 2a_k$ | $I_k$ | $2a_k - I_k$ |
| $-2a_k < I_k \leq 0$ | $I_k$ | $I_k + 2a_k$ |
| $I_k \leq -2a_k$ | $2I_k + 2a_k$ | $I_k + 2a_k$ |

TABLE 2

| Condition of $Q_k$ | $\Lambda(s_{k,1})$ | $\Lambda(s_{k,0})$ |
|---|---|---|
| $Q_k > 2a_k$ | $2Q_k - 2a_k$ | $2a_k - Q_k$ |
| $0 < Q_k \leq 2a_k$ | $2Q_k - 2a_k$ | $2a_k - Q_k$ |
| $-2a_k < Q_k \leq 0$ | $Q_k$ | $Q_k + 2a_k$ |
| $Q_k \leq -2a_k$ | $2Q_k + 2a_k$ | $Q_k + 2a_k$ |

Table 1 shows the metric of 16QAM generated from $I_k$ and Table 2 shows the metric of 16QAM generated from $Q_k$. In the same manner, soft bit metrics of $\Lambda(s_{k,5})$, $\Lambda(s_{k,4})$ and $\Lambda(s_{k,3})$ related to 64QAM can be computed as shown in Table 3. Also, $\Lambda(s_{k,2})$, $\Lambda(s_{k,1})$ and $\Lambda(s_{k,0})$ can be computed from $Q_k$. Next, a soft output related to $I_k$ will be described.

TABLE 3

| Condition of $I_k$ | $\Lambda(s_{k,5})$ | $\Lambda(s_{k,4})$ | $\Lambda(s_{k,3})$ |
|---|---|---|---|
| $I_k > 6a_k$ | $4I_k - 12a_k$ | $10a_k - 2I_k$ | $6a_k - I_k$ |
| $4a_k < I_k \leq 6a_k$ | $3I_k - 6a_k$ | $4a_k - I_k$ | $6a_k - I_k$ |
| $2a_k < I_k \leq 4a_k$ | $2I_k - 2a_k$ | $4a_k - I_k$ | $I_k - 2a_k$ |
| $0 < I_k \leq -2a_k$ | $I_k$ | $6a_k - 2I_k$ | $I_k - 2a_k$ |
| $-2a_k < I_k \leq 0$ | $I_k$ | $6a_k + 2I_k$ | $-I_k - 2a_k$ |
| $-4a_k < I_k \leq -2a_k$ | $2I_k + 2a_k$ | $4a_k + I_k$ | $-I_k - 2a_k$ |
| $-6a_k < I_k \leq -4a_k$ | $3I_k + 6a_k$ | $4a_k + I_k$ | $6a_k + I_k$ |
| $I_k \leq -6a_k$ | $4I_k + 12a_k$ | $10a_k + 2I_k$ | $6a_k + I_k$ |

Table 3 shows the soft metric of 64QAM generated from $I_k$. In this manner, soft outputs of QPSK, 16QAM and 64QAM can be computed. However, the soft output value itself is computed by eliminating $4c/\sigma_n^2$, from Equation (7) for expressing an original input LLR of the decoder.

In an exemplary hardware implementation, a dynamic range of the input metric of the decoder may excessively increase or performance may be degraded. Therefore, $c/\sigma_n^2$ is reflected in normalization.

Figure 5:
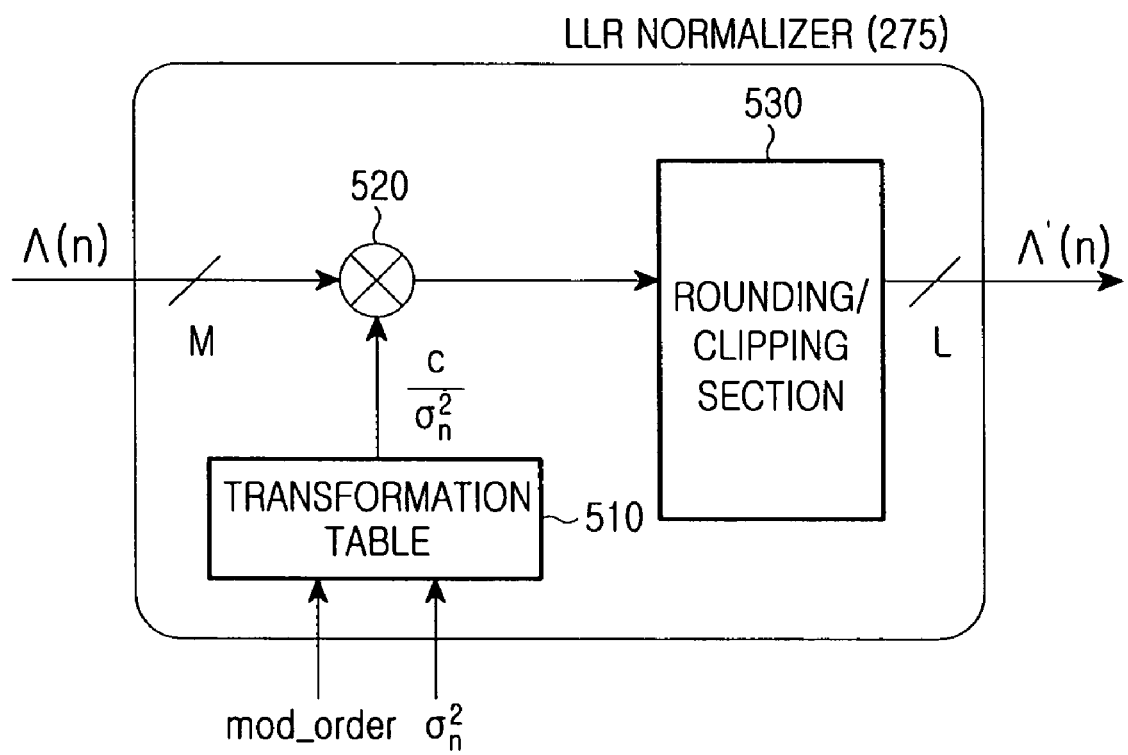
FIG. 5 illustrates an operation structure of the input metric normalizer in accordance with the first exemplary embodiment of the present invention.

FIG. 5 illustrates an exemplary implementation of an operational structure of the input metric normalizer in accordance with the first exemplary embodiment of the present invention.

FIG. 5 illustrates an example of the metric normalizer for reflecting the value of $c/\sigma_n^2$. Because "c" values are stored according to modulation schemes of QPSK, 16QAM and 64QAM, the normalizer 275 can set the "c" value when receiving a modulation order or modulation information mod_order mapped thereto. In order to compute the noise variance $\sigma_n^2$ corresponding to the variance of a sum of noise and interference, a noise variance estimator (as indicated by reference numeral 265 of FIG. 2) is required. The noise variance estimator 265 can estimate the noise variance value of $\sigma_n^2$ using various algorithms.

In the normalizer 275, a multiplier 520 receives $c/\sigma_n^2$ computed by transforming the variance value using a transformation table 510 in which division is reflected. When multiplier 520 multiplies the metric $\Lambda(n)$ from the demapper 270 by $c/\sigma_n^2$, the LLR is normalized. After normalizing the LLR, a rounding/clipping section 530 inputs an LLR $\Lambda'(n)$ having a desired range and a desired number of bits to the decoder. According to modulation order or code rate supported by the system, the number M of bits of the input metric is about 24~26 and the number of normalized output bits is 6~8.

In FIG. 5, the noise variance can be estimated in various methods. For example, there can be used a method disclosed in Reference Literature 1 (T. A. Summers and S. G. Wilson, "SNR mismatch and online estimation in turbo decoding," IEEE Trans. Commun. vol. 46, no. 4, April 1998), the disclosure of which is hereby incorporated by reference. Further, the variance related to the noise and interference, that is, the noise variance, can be estimated from a pilot channel of a CDMA system or a pilot tone of an OFDM system.

Figure 6:
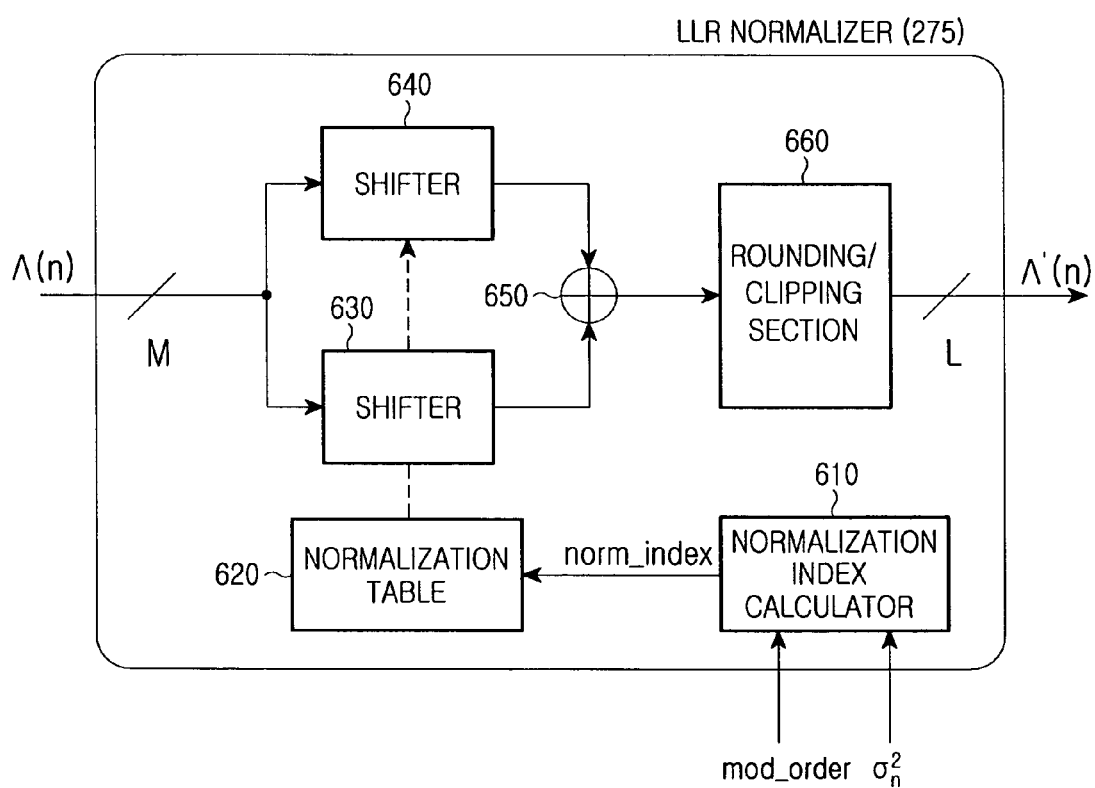
FIG. 6 illustrates another operation structure of the input metric normalizer in accordance with the first exemplary embodiment of the present invention.

FIG. 6 illustrates another exemplary implementation of an operational structure of the input metric normalizer in accordance with the first exemplary embodiment of the present invention.

FIG. 6 illustrates an example of implementing the normalizer of FIG. 5. The normalization is implemented with two shifters 630 and 640 and one adder 650. This normalization structure can perform proper normalization while minimizing power consumption.

In FIG. 6, the modulation order (mod_order) and the noise variance are input to a normalization index calculator 610, such that a normalization index (norm_index) is computed.

Next, an example of a normalization method will be described in detail. The normalization index calculator 610 has temp_norm_index mapped to estimation values capable of being received from the noise variance estimator 265. Because division by the noise variance should be reflected, temp_norm_index in inverse proportion to the noise variance value should be selected. For example, temp_norm_index should be selected so that [Gain (temp_norm_index) (dB)]+ $[\sigma_n^2 \text{(dB)}]+a=0$. Only, "a" is a constant defined in relation to an operation range for noise and data channel values. Gain and noise estimates take a log function and are expressed by the dB scale. Further, [.] denotes transformation into an integer closest to the input. In order to reflect multiplication by the constant c varying with the modulation order, a norm_index value is acquired using the following computation.

norm_index=temp_norm_index, (QPSK)

norm_index=temp_norm_index-2, (16QAM)

norm_index=temp_norm_index-4, (64QAM)

In a normalization table 620, the norm_index value is transformed into a normalization gain value multiplied by a normalization coefficient as shown in Table 4. In one step of Table 4, the adjustment of LLR normalization of about 3 dB is possible. The normalization coefficients of Table 4 can be divided into more precise steps and can use multiple adders, only if more precise adjustment is possible and the number of LLR bits is to be reduced.

Then, a value computed by multiplying the norm_index value by the normalization coefficient is input to the shifters 630 and 640 and is used to perform a shift operation on the metric $\Lambda(n)$ from the demapper 270. The shifted values are added in the adder 650, such that an LLR is computed. The normalized LLR is input to a rounding/clipping section 660. An LLR $\Lambda'(n)$ of a desired range and a desired number of bits is output from the rounding & clipping section 660.

TABLE 4

| NORM_INDEX | Gain |
|---|---|
| '0'00000 | 96 |
| '1'00001 | 64 |
| '2'00010 | 48 |
| '3'00011 | 32 |
| '4'00100 | 24 |
| '5'00101 | 16 |
| '6'00110 | 12 = 8 + 4 |
| '7'00111 | 8 |
| '8'01000 | 6 = 4 + 2 |
| '9'01001 | 4 |
| '10'01010 | 3 = 2 + 1 |
| '11'01011 | 2 |
| '12'01100 | 1.5 = 1 + ½ |
| '13'01101 | 1 |
| '14'01110 | 0.75 = ½ + ¼ |
| '15'01111 | 0.5 |
| '16'10000 | 0.375 = ¼ + ⅛ |
| '17'10001 | 0.25 |
| '18'10010 | 0.1875 = ⅛ + 1/16 |
| '19'10011 | 0.125 |
| '20'10100 | 0.09375 = 1/16 + 1/32 |
| '21'10101 | 0.0625 |

TABLE 4-continued

| NORM_INDEX | Gain |
| --- | --- |
| '22'10110 | 0.046875 = 1/32 + 1/64 |
| '23'10111 | 0.03125 |
| '24'-'31' | — |

The above-described normalization method is an example of implementing the normalization in the channel decoder of the system using QPSK, 16QAM and 64QAM. Of course, the present invention includes all possible methods for an output LLR of the SMG using the noise estimate and the modulation order.

Second Exemplary Embodiment

There is the case where it is difficult to compute an exact noise variance value in a communication system, which is different from the first exemplary embodiment. In the case of channel codes such as turbo codes and low density parity check (LDPC) codes approaching the Shannon limit of channel capacity without error, a noise threshold is present at a predetermined signal to noise ratio (SNR) and an error-free transmission is possible at a higher SNR. That is, if the modulation order, code rate and frame size are set in a communication system using various modulations and code rates, an SNR of an operation zone is defined which can achieve a frame error rate (FER) required by the system. When this SNR is predefined in the system, it can be used for the normalization of an LLR.

In an exemplary implementation, a desired value can be obtained through simulations of the system when the modulation and the code rate can be set in the system.

Figure 7:
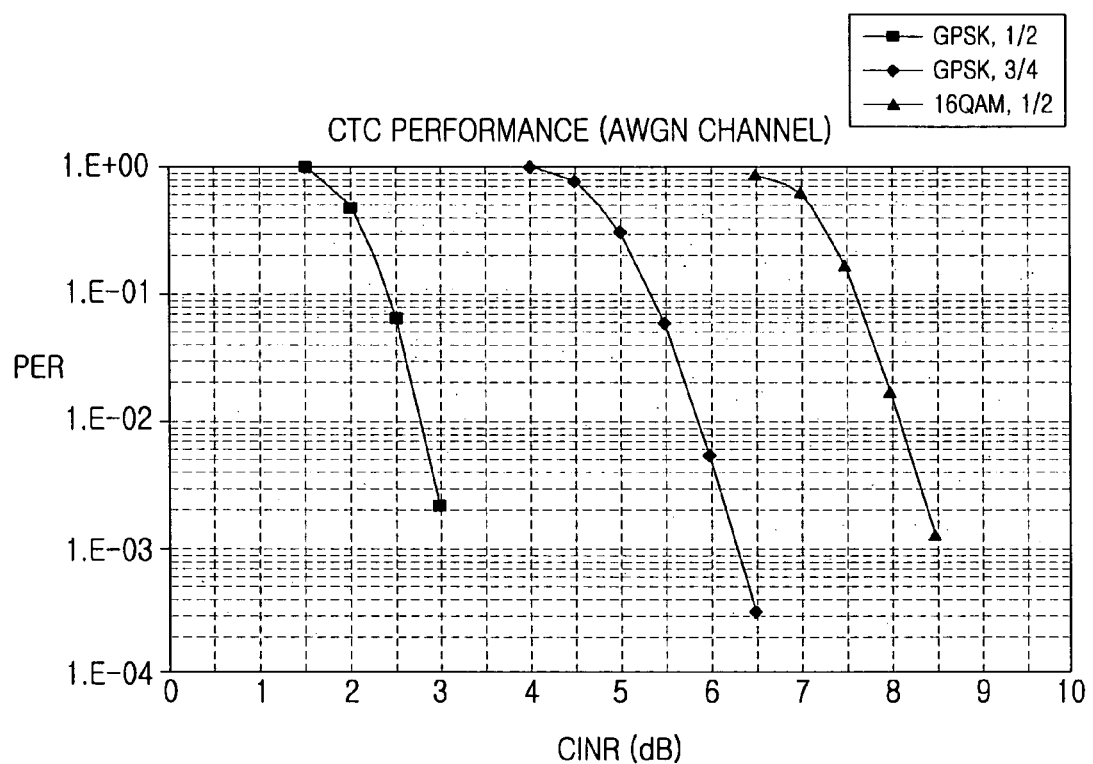
FIG. 7 illustrates the frame error rate (FER) performance of an additive white Gaussian noise (AWGN) channel.

FIG. 7 illustrates the FER performance of an additive white Gaussian noise (AWGN) channel with respect to QPSK and ½ coding, QPSK and ¾ coding, and 16QAM and ½ coding in the IEEE 802.16e system.

Referring to FIG. 7, a carrier to interference and noise ratio (CINR) or a static operation is about 2~3 dB in the case of QPSK and ½ coding when the FER required by the system is about 1%. Because the CINR is sufficiently high in an SNR region of more about 2~3 dB even when the normalization of an LLR is not optimal, the FER is sufficiently reduced and therefore the overall system performance is not affected thereby. In the case of a lower CINR, the FER has a value close to "1" regardless of the LLR normalization.

Therefore, performance in the LLR normalization is not almost degraded even when the system uses a predefined value without use of the actually measured noise variance. When signal power obtained by automatic gain control is basically known, an SNR is defined, such that a noise variance value can be also detected. In the case of the QPSK and ½ coding, it is assumed that a basic operation zone has 3 dB. Further, assuming that an automatic gain loop is applied and signal power P is constant, the noise variance mapped to the signal power P and a CINR of 3 dB has a relation as shown in the following equation.

$$20\log_{10}\left(\frac{P}{\hat{\sigma}_n^2}\right) = 3 \quad (11)$$

That is, the noise variance is defined as shown in the following equation.

$$\hat{\sigma}_n^2 = \frac{P}{10^{0.15}} \quad (12)$$

If the computed noise variance is prestored in the receiver, an optimal performance can be obtained when the LLR normalization is performed using a prestored noise variance value even though an actual noise variance value is not computed every time in the case of the QPSK and ½ coding.

In the second exemplary embodiment of the present invention, the CINR is fixed to about 3 dB on the basis of the AWGN. In an exemplary scenario, QAM symbols constructing one frame suffer from almost independent fading due to interleaving and so on. The FER of 1% required by the system is achieved at a higher CINR compared with the AWGN. Accordingly, in the exemplary scenario the noise variance value prestored in the system should be set while considering the FER. The example of QPSK and ½ coding has been described. Of course, the same manner can be applied even when other modulation orders and other code rates are selected.

In an exemplary implementation, an auto gain controller (AGC) of the system normally operates in the case of the above-described configuration and a change from an ideal value is not large.

Figure 8:
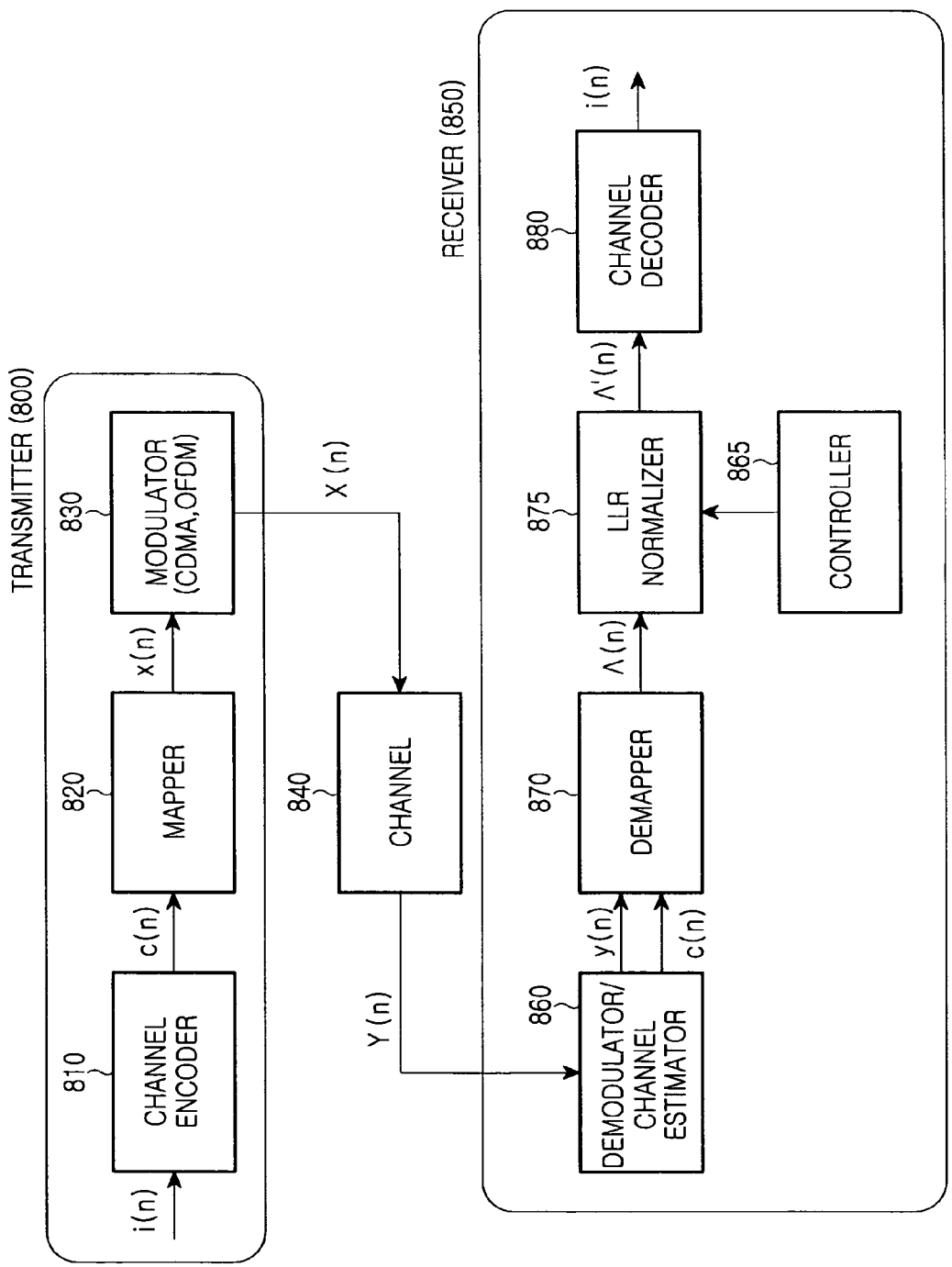
FIG. 8 illustrates a structure of a transceiver to which an input metric normalizer is applied in accordance with a second exemplary embodiment of the present invention.

FIG. 8 illustrates a structure of a wireless communication transceiver to which a metric normalizer is applied in accordance with a second exemplary embodiment of the present invention.

Referring to FIG. 8, binary data i(n) to be transmitted is encoded in a channel encoder 810 within a transmitter 800. The channel encoder 810 generates a series of binary code symbols c(n). A mapper 820 generates a block of several code symbols of the generated code symbols, performs mapping to one point on a signal constellation, and performs transformation into a modulation symbol x(n) of a complex value. The sequence x(n) is applied to a modulator 830. The modulator 830 generates a continuous-time wave in a CDMA or OFDM scheme according to symbol and transmits the generated wave to a receiver 850 through a channel 840.

In the receiver 850, a demodulator/channel estimator 860 performs baseband demodulation and channel estimation processes for a signal passing through the channel 840. The demodulator can be implemented according to technologies applied to a baseband. For example, the demodulator can be an OFDM demodulator implemented with a CDMA Rake receiver or an IFFT processor and a channel estimator.

A channel estimate and a received symbol obtained after baseband modulation are output from the demodulator/channel estimator 860 to the demapper 870. The demapper 870 receives a channel estimate c(n) and a received symbol y(n) modulated by QAM or PSK from the demodulator/channel estimator 860 and outputs metric per bit through demapping. The demapper 870 can acquire the metric using various algorithms. The demapping algorithm as described with reference to FIG. 2 can be used.

Since a convolutional turbo decoder serving as a channel decoder 880 receives and decodes soft metric corresponding to reliability information of each bit in the receiver 850 of the IEEE 802.16 system, a process for computing the soft metric from a distorted received signal is required in a front stage of the channel decoder 880. This process is performed by the demapper 870 in the receiver 850.

According to metric Λ(n) output from the demapper 870 and adaptive modulation and coding (AMC) information of the above-described modulation and code rate from a controller 865, an LLR normalizer 875 receives and normalizes a predefined noise variance value. A channel decoder 880 receives the normalized value Λ'(n) and then outputs i(n).

Figure 9:
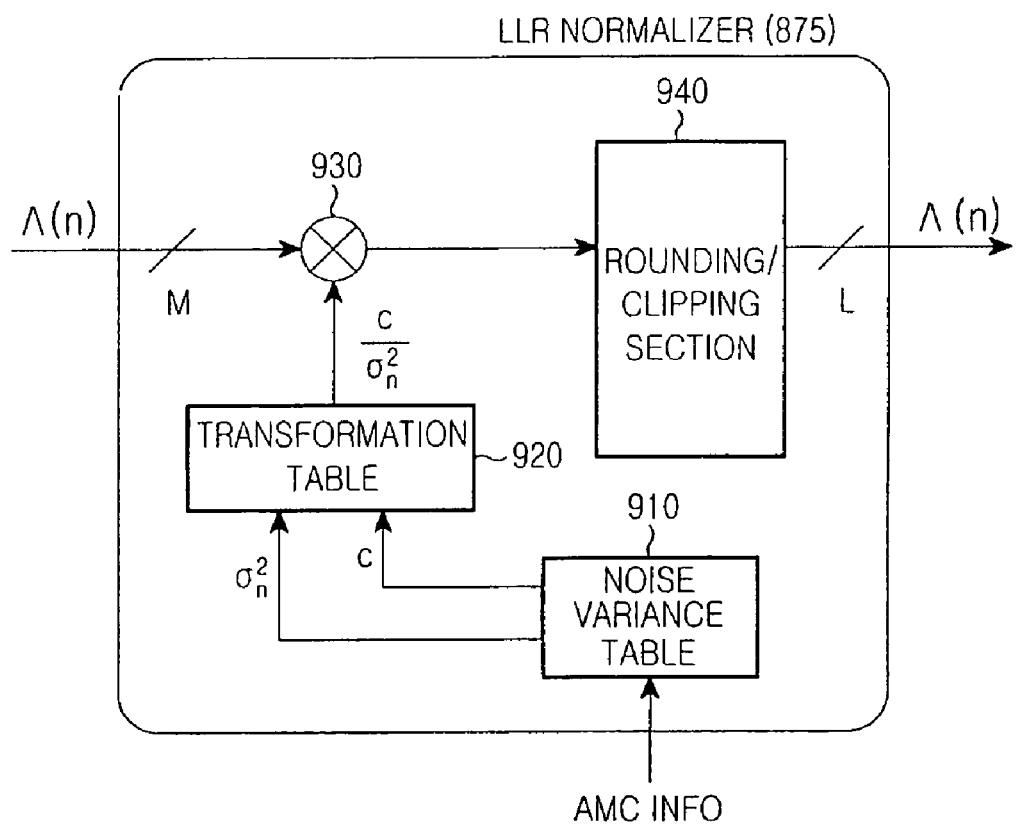
FIG. 9 illustrates an operation structure of the input metric normalizer in accordance with the second exemplary embodiment of the present invention.

FIG. 9 illustrates an exemplary implementation of an operational structure of the input metric normalizer in accordance with the second exemplary embodiment of the present invention.

In FIG. 9, a predefined noise variance table is used according to AMC information of modulation and a code rate. Referring to FIG. 9, a noise variance table 910 of the normalizer 875 stores "c" values according to modulation schemes of QPSK, 16QAM and 64QAM. When receiving AMC information such as a modulation order, code rate, frame size, and so on, the normalizer 875 can set a reference "c" value according to noise value and modulation order predefined by the AMC information.

In the normalizer 875, a multiplier 930 receives $c/\sigma_n^2$ computed by transforming the noise variance value and the reference "c" value using a transformation table 920 in which division is reflected. When the multiplier 930 multiplies the metric Λ(n) from the demapper 870 by $c/\sigma_n^2$, the LLR is normalized. After normalizing the LLR, a rounding/clipping section 940 inputs an LLR Λ'(n) having a desired range and a desired number of bits to the decoder.

Figure 10:
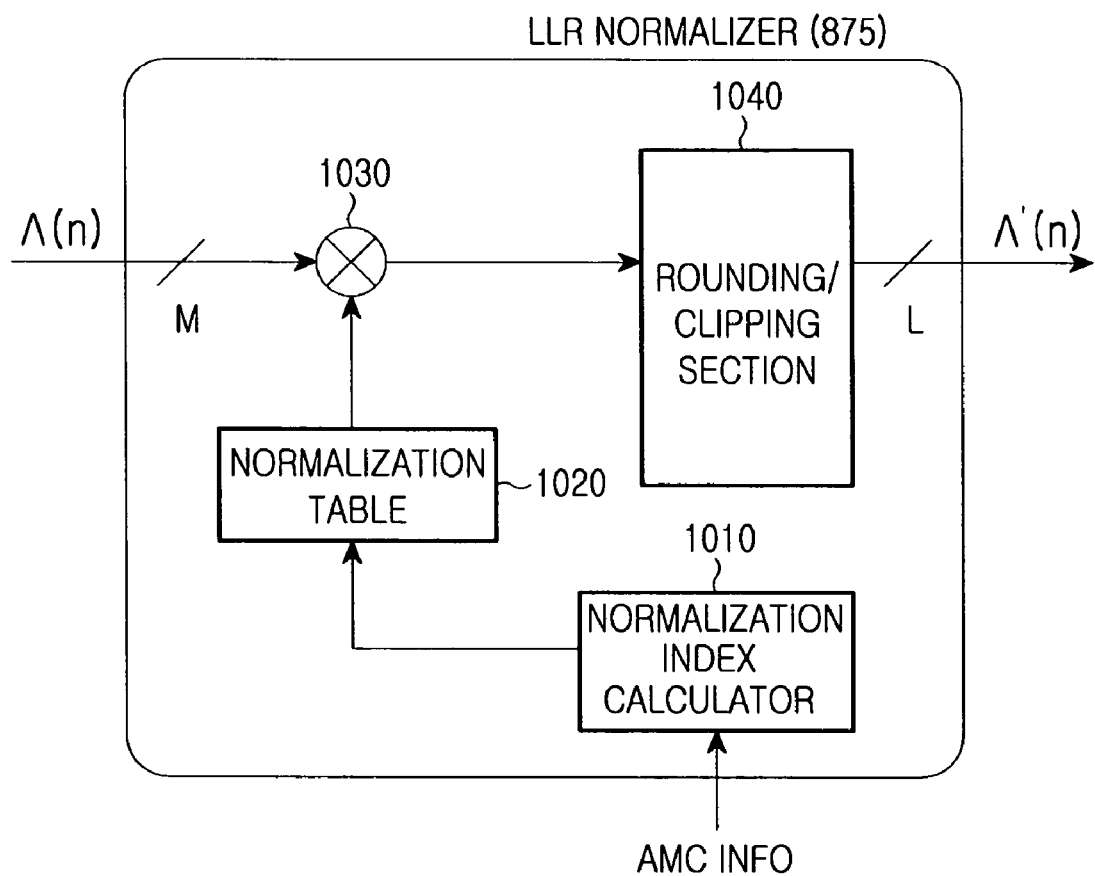
FIG. 10 illustrates another operation structure of the input metric normalizer in accordance with the second exemplary embodiment of the present invention.

FIG. 10 illustrates another exemplary implementation of an operational structure of the input metric normalizer in accordance with the second exemplary embodiment of the present invention.

In FIG. 10, the normalizer predefines a set of normalization coefficients in place of the transformation table 920 of FIG. 9, receives only a normalization index, and sets a normalization coefficient.

A normalization index calculator 1010 receives information about a modulation order, code rate, frame size and so on, sets a normalization index in which the "c" value and the noise variance value can be reflected, outputs the set normalization index to a normalization table 1020. The normalization index value can be set using a predefined table.

When receiving the set normalization index, a set of possible normalization coefficients can be predefined in the normalization table 1020. When the normalization index is received, a normalization coefficient is set. When a multiplier 1030 multiplies the metric Λ(n) from the demapper 870 by the normalization coefficient, the LLR is normalized. After normalizing the LLR, a rounding/clipping section 1040 inputs an LLR Λ'(n) having a desired range and a desired number of bits to the decoder.

Figure 11:
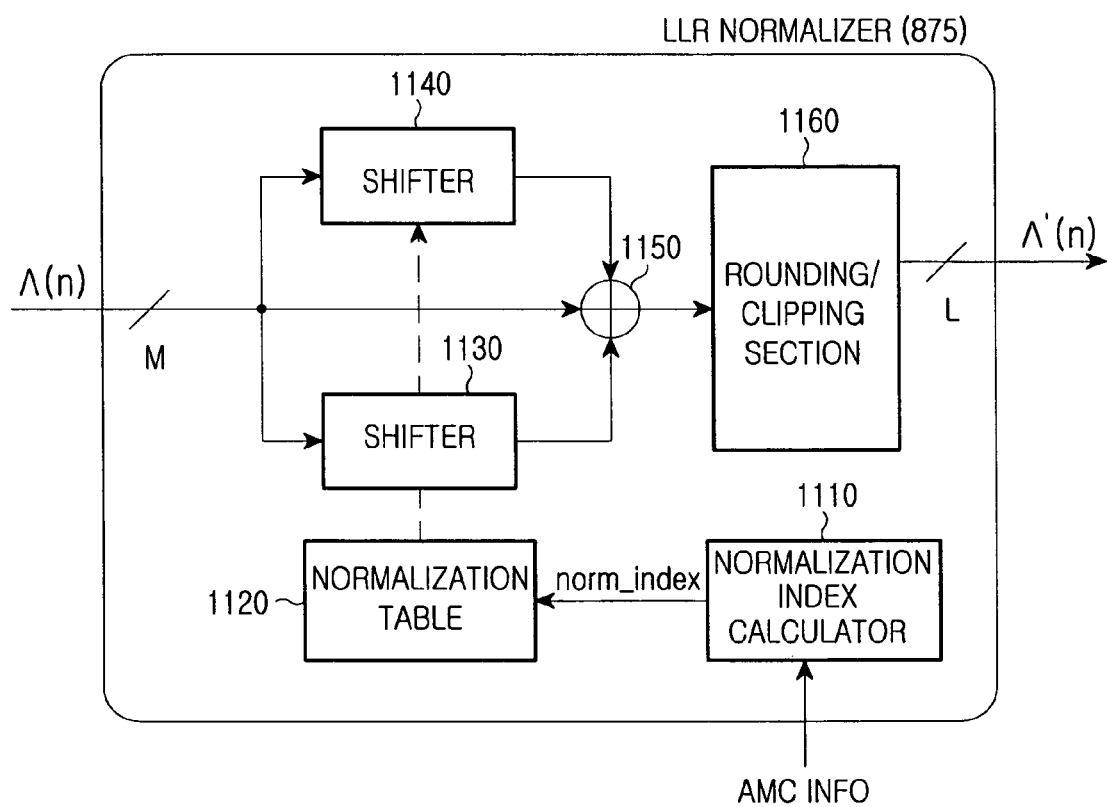
FIG. 11 illustrates yet another operation structure of the input metric normalizer in accordance with the second exemplary embodiment of the present invention.

FIG. 11 illustrates yet another exemplary implementation of an operational structure of the input metric normalizer in accordance with the second exemplary embodiment of the present invention.

FIG. 11 illustrates the structure obtained by simplifying the structure of FIG. 10. The normalization is implemented with two shifters 1130 and 1140 and one adder 1150. This normalization structure can perform proper normalization while minimizing power consumption.

Information about modulation and a code rate (or a forward error correction (FEC) code type) is input to a normalization index calculator 1110, such that a normalization index (norm_index) is computed. In the normalization table 1120, the computed norm_index value is transformed into a normalization gain value multiplied by the normalization coefficient as shown in Table 4. In one step of Table 4, the adjustment of LLR normalization of about 3 dB is possible. The normalization coefficients of Table 4 can be divided into more precise steps and can use multiple adders, only if more precise adjustment is possible and the number of LLR bits is to be reduced.

Then, a value computed by multiplying the norm_index value by the normalization coefficient is input to the shifters 1130 and 1140 and is used to perform a shift operation on the metric Λ(n) from the demapper 870. The shifted values are added in the adder 1150, such that an LLR is computed. The normalized LLR is input to a rounding/clipping section 1160. An LLR Λ'(n) having a desired range and a desired number of bits is output.

An example of a normalization method using Table 4 is as follows.

This example is used for a situation in which it is difficult to estimate the exact noise variance in the IEEE 802.16e system. There is used the fact that codes at the same code rate in the same modulation scheme have the FER of 1% at the almost same SNR. In each modulation scheme, an SNR at which the FET is 1% is computed and norm_index in which a virtual noise index is reflected is provided. The IEEE 802.16e system has the following modulation codes with respect to data bursts to which convolutional turbo codes are applied. In this implementation example, norm_index_basic is used for the actual norm_index. Table 5 shows an example of IEEE 802.16e normalization when the structure of FIG. 8 is implemented.

TABLE 5

| FEC code type | Modulation | Code rate | Gain | Norm_index_basic |
|---|---|---|---|---|
| 0 | QPSK | ½ | 2.0 | 11 |
| 1 | QPSK | ¾ | 6.0 | 8 |
| 2 | 16 QAM | ½ | 3.0 | 10 |
| 3 | 16 QAM | ¾ | 8.0 | 7 |
| 4 | 64 QAM | ½ | 8.0 | 7 |
| 5 | 64 QAM | ⅔ | 12.0 | 6 |
| 6 | 64 QAM | ¾ | 16.0 | 5 |
| 7 | 64 QAM | ⅚ | 24.0 | 4 |

In Table 5, norm_index_basic is used to reflect burst boosting or zone boosting defined in the IEEE 802.16e system. The IEEE 802.16e system supports boosting of −12 dB~9 dB in a burst power control concept. When a frequency reuse factor is ⅓, zone boosting of 4.77 dB is supported. In this case, because an LLR value is affected by boosting, it is compensated, such that an effective operation zone of the LLR can be reduced. For example, norm_index can be computed as shown in the following equation.

$$\text{norm\_index} = \begin{cases} \text{norm\_index\_basic} + [\text{boosting}/3.0], & \text{if zone boosting on} = 0 \\ \text{norm\_index\_basic} + [\text{boosting}/3.0] + 3, & \text{if zone boosting on} = 1 \end{cases} \quad (13)$$

In Equation (13), a boosting unit is dB and [a] denotes rounding off to the nearest integer. Further, norm_index has a value within a given range [0 24]. Using this method, more general LLR normalization is possible.

The above-described implementation methods of the present invention are examples of methods for normalizing an LLR corresponding to input metric to a decoder using a normalization coefficient and AMC information. The present invention applies normalization to an output of a soft output generator serving as a demapper and includes all implementations in which the normalization is performed using the AMC information.

Figure 12:
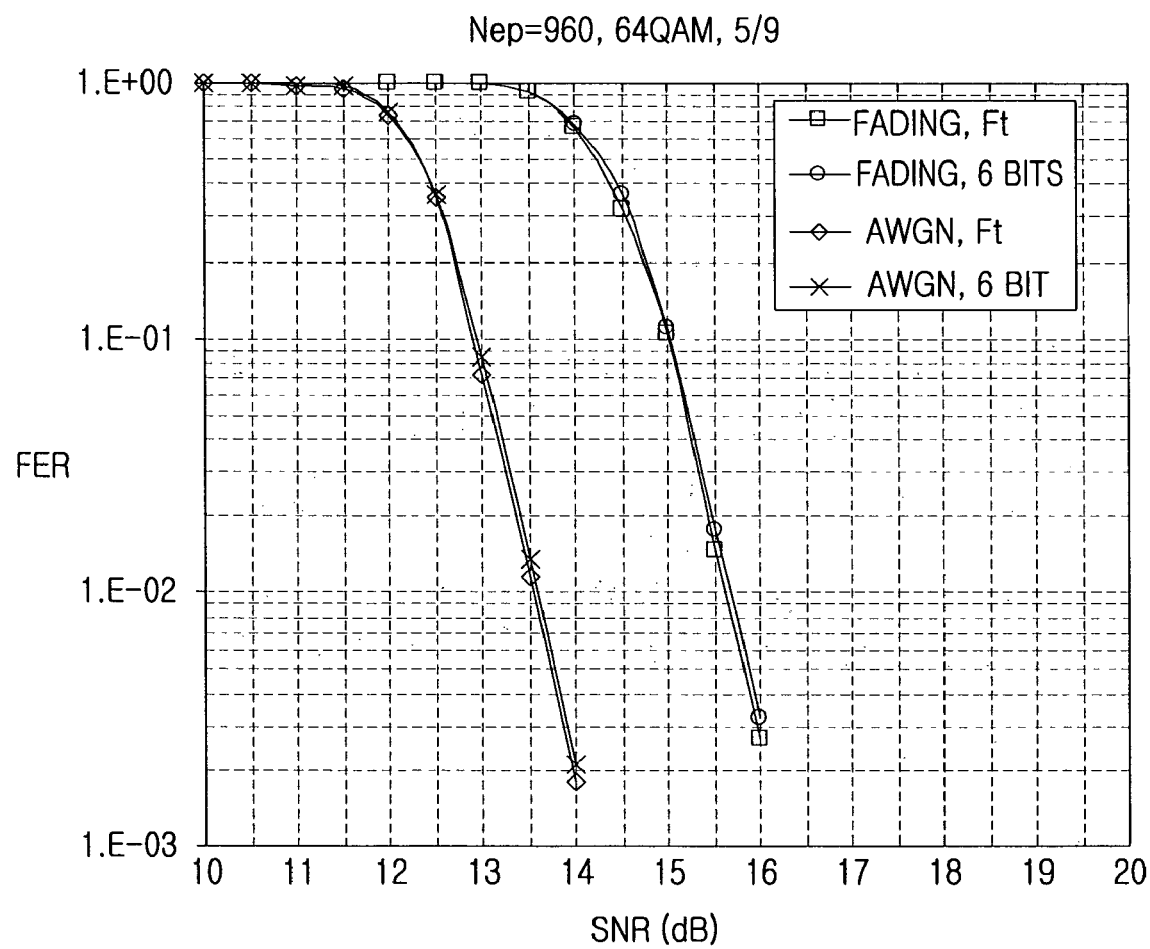
FIG. 12 illustrates the performance of a convolutional turbo decoder for 6-bit input metric applied to the metric normalizer in accordance with the first and second exemplary embodiments of the present invention.
Figure 13:
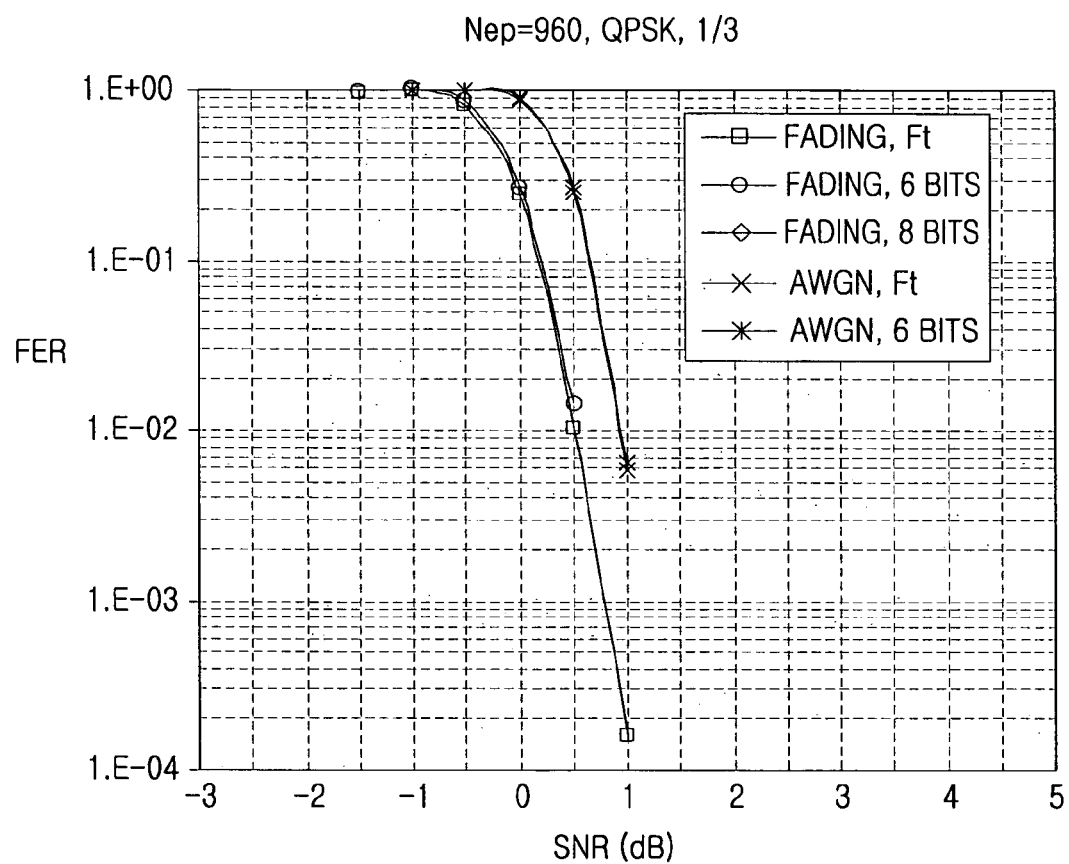
FIG. 13 illustrates the performance of a convolutional turbo decoder for 6-bit input metric applied to the metric normalizer in accordance with the first and second exemplary embodiments of the present invention.

FIGS. 12 and 13 illustrate the performance of convolutional turbo codes defined in the IEEE 802.16e system in the case where 6 or 8-bit soft input metric is used and in the case where a floating-point operation is performed. A turbo decoder uses a max-log-MAP method. It can be seen that a performance difference is almost absent between the exemplary implementations of the present invention using a normalized LLR of 6 or 8 bits (as indicated by "Fading, 6 bits" or "AWGN, 6 bits" and "Fading, 8 bits) and a floating-point operation (as indicated by "Fading, Ft" and "AWGN, Ft").

As is apparent from the above description, the exemplary implementations of certain embodiments of the present invention have the following effects.

In accordance with an exemplary embodiment of the present invention, a channel has a different value in every symbol through normalization of a soft output from a demapper in a wireless communication system. Also in the case of an OFDM system requiring higher resolution of metric, the desired performance can be obtained with an input of a small number of bits to a turbo decoder.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. An apparatus for normalizing input soft metric to a channel decoder in a wireless communication system, comprising:
 a demapper for generating a soft metric per bit for a received modulated symbol; and
 a normalizer for receiving the soft metric, computing a normalized log likelihood ratio (LLR) by using a modulation order of the received modulated symbol and a noise variance value to the soft metric, transforming the normalized LLR into a number of bits, and outputting the transformed LLR to the channel decoder,
 wherein the normalizer comprises:
 a transformation table for transforming the noise variance value computed from a channel estimate of the received modulated symbol into a ratio of a constant value to the noise variance value;
 a multiplier for multiplying the soft metric output from the demapper by the received ratio of the constant value to the noise variance value, and outputting the normalized LLR; and
 a rounding/clipping section for transforming the normalized LLR into the number of bits and outputting the transformed LLR to the channel decoder.

2. The apparatus of claim 1, wherein the demapper generates the soft metric using at least one of an in-phase component ($X_k$) and a quadrature component ($Y_k$) of the received modulated symbol ($R_k$), a channel fading coefficient ($g_k$) and the constant value (c) defined by the modulation order of the received modulated symbol.

3. The apparatus of claim 1, wherein the normalizer performs normalization by multiplying the soft metric by $$4\frac{c}{\sigma_n^2},$$

where $\sigma_n^2$ is the noise variance value computed from a channel estimate of the received modulated symbol and c is the constant value defined by the modulation order of the received modulated symbol.

4. The apparatus of claim 3, wherein the soft metric is generated by:

| Condition of $I_k$ | $\Lambda(s_{k,3})$ | $\Lambda(s_{k,2})$ |
|---|---|---|
| $I_k > 2a_k$ | $2I_k - 2a_k$ | $2a_k - I_k$ |
| $0 < I_k \leq 2a_k$ | $I_k$ | $2a_k - I_k$ |
| $-2a_k < I_k \leq 0$ | $I_k$ | $I_k + 2a_k$ |
| $I_k \leq -2a_k$ | $2I_k + 2a_k$ | $I_k + 2a_k$ | and

| Condition of $Q_k$ | $\Lambda(s_{k,1})$ | $\Lambda(s_{k,0})$ |
|---|---|---|
| $Q_k > 2a_k$ | $2Q_k - 2a_k$ | $2a_k - Q_k$ |
| $0 < Q_k \leq 2a_k$ | $2Q_k - 2a_k$ | $2a_k - Q_k$ |
| $-2a_k < Q_k \leq 0$ | $Q_k$ | $Q_k + 2a_k$ |
| $Q_k \leq -2a_k$ | $2Q_k + 2a_k$ | $Q_k + 2a_k$, | where $I_k$, $Q_k$ and $a_k$ are $|g_k|^2 X_k$, $|g_k|^2 Y_k$ and $|g_k|^2 c$, respectively, $X_k$ is at least one of an in-phase component, $Y_k$ is a quadrature component of the received modulated symbol ($R_k$), $g_k$ is a channel fading coefficient and c is the constant value defined by a modulation order of the received modulated symbol.

5. An apparatus for normalizing input soft metric to a channel decoder in a wireless communication system, the apparatus comprising:
 a demapper for generating a soft metric per bit for a received modulated symbol; and
 a normalizer for receiving the soft metric, computing a normalized log likelihood ratio (LLR) by using a modulation order of the received modulated symbol and a noise variance value to the soft metric, transforming the normalized LLR into a number of bits, and outputting the transformed LLR to the channel decoder,
 wherein the normalizer comprises:
 a normalization index calculator for receiving the noise variance value computed from a channel estimate of the received modulated symbol, selecting a temporary normalization index mapped to division by the noise variance value, and generating a normalization index by subtracting a predetermined value according to the modulation order from the selected temporary normalization index;
 a normalization table for transforming the normalization index into a normalization gain value computed by multiplying the normalization index by a normalization coefficient;
 shifters for shifting an in-phase component and a quadrature component of the received modulated symbol according to the normalization gain value;
 an adder for adding the shifted values; and
 a rounding/clipping section for transforming the normalized LLR into the number of bits and outputting the transformed LLR to the channel decoder.

6. An apparatus for normalizing input soft metric to a channel decoder in a wireless communication system, comprising:
 a demapper for generating a soft metric per bit for a received modulated symbol; and a normalizer for receiving the soft metric, computing a normalized log likelihood ratio (LLR) by multiplying the soft metric by a normalization coefficient computed by adaptive modulation and coding (AMC) information, transforming the normalized LLR into a number of bits, and outputting the transformed LLR to the channel decoder, wherein the normalizer comprises:

a noise variance table for setting and outputting a noise variance value and a constant value according to at least one of pieces of information input from a reception controller storing the AMC information and boosting information;

a transformation table for transforming the noise variance value and the constant value into a ratio of the constant value to the noise variance value;

a multiplier for multiplying the soft metric output from the demapper by the ratio of the constant value to the noise variance value, and outputting the normalized LLR; and a rounding/clipping section for transforming the normalized LLR into the number of bits and outputting the transformed LLR to the channel decoder.

7. The apparatus of claim 6, wherein the demapper generates the soft metric using at least one of an in-phase component ($X_k$) and a quadrature component ($Y_k$) of the received modulated symbol ($R_k$), a channel fading coefficient ($g_k$) and the constant value (c) defined by a modulation order of the received modulated symbol.

8. The apparatus of claim 6, wherein the normalizer performs normalization by multiplying the soft metric by the normalization coefficient, the normalization coefficient being set by a normalization index computed by the AMC information.

9. The apparatus of claim 8, wherein the soft metric is generated by:

| Condition of $I_k$ | $\Lambda(s_{k,3})$ | $\Lambda(s_{k,2})$ |
|---|---|---|
| $I_k > 2a_k$ | $2I_k - 2a_k$ | $2a_k - I_k$ |
| $0 < I_k \leq 2a_k$ | $I_k$ | $2a_k - I_k$ |
| $-2a_k < I_k \leq 0$ | $I_k$ | $I_k + 2a_k$ |
| $I_k \leq -2a_k$ | $2I_k + 2a_k$ | $I_k + 2a_k$ | and

| Condition of $I_k$ | $\Lambda(s_{k,5})$ | $\Lambda(s_{k,4})$ | $\Lambda(s_{k,3})$ |
|---|---|---|---|
| $I_k > 6a_k$ | $4I_k - 12a_k$ | $10a_k - 2I_k$ | $6a_k - I_k$ |
| $4a_k < I_k \leq 6a_k$ | $3I_k - 6a_k$ | $4a_k - I_k$ | $6a_k - I_k$ |
| $2a_k < I_k \leq 4a_k$ | $2I_k - 2a_k$ | $4a_k - I_k$ | $I_k - 2a_k$ |
| $0 < I_k \leq 2a_k$ | $I_k$ | $6a_k - 2I_k$ | $I_k - 2a_k$ |
| $-2a_k < I_k \leq 0$ | $I_k$ | $6a_k + 2I_k$ | $-I_k - 2a_k$ |
| $-4a_k < I_k \leq -2a_k$ | $2I_k + 2a_k$ | $4a_k + I_k$ | $-I_k - 2a_k$ |
| $-6a_k < I_k \leq -4a_k$ | $3I_k + 6a_k$ | $4a_k + I_k$ | $6a_k + I_k$ |
| $I_k \leq -6a_k$ | $4I_k + 12a_k$ | $10a_k + 2I_k$ | $6a_k + I_k$, | where $I_k$, $Q_k$, and $a_k$ are $|g_k|^2 X_k$, $|g_k|^2 Y_k$ and $|g_k|^2 c$, respectively, $X_k$ is at least one of an in-phase component, $Y_k$ is a quadrature component of the received modulated symbol ($R_k$), $g_k$ is a channel fading coefficient and c is the constant value defined by a modulation order of the received modulated symbol.

10. The apparatus of claim 6, wherein the AMC information comprises at least one of a modulation order, a code rate and a frame size.

11. An apparatus for normalizing input soft metric to a channel decoder in a wireless communication system, comprising:

a demapper for generating a soft metric per bit for a received modulated symbol; and a normalizer for receiving the soft metric, computing a normalized log likelihood ratio (LLR) by multiplying the soft metric by a normalization coefficient being set by a normalization index computed by adaptive modulation and coding (AMC) information, transforming the normalized LLR into a number of bits, and outputting the transformed LLR to the channel decoder, wherein the normalizer comprises:

a normalization index calculator for generating the normalization index in which a noise variance value and a constant value are reflected according to at least one of pieces of information input from a reception controller storing the AMC information and boosting information;

a normalization table for setting the normalization coefficient mapped to the normalization index;

a multiplier for multiplying the soft metric output from the demapper by the set normalization coefficient, and outputting the normalized LLR; and a rounding/clipping section for transforming the normalized LLR into the number of bits and outputting the transformed LLR to the channel decoder.

12. An apparatus for normalizing input soft metric to a channel decoder in a wireless communication system, comprising:

a demapper for generating a soft metric per bit for a received modulated symbol; and a normalizer for receiving the soft metric, computing a normalized log likelihood ratio (LLR) by multiplying the soft metric by a normalization coefficient computed by adaptive modulation and coding (AMC) information, transforming the normalized LLR into a number of bits, and outputting the transformed LLR to the channel decoder, wherein the normalizer comprises:

a normalization index calculator for generating a normalization index in which a noise variance value and a constant value are reflected according to at least one of pieces of information input from a reception controller storing the AMC information and boosting information;

a normalization table for transforming the normalization index into a normalization gain value computed by multiplying the normalization index by the normalization coefficient;

shifters for shifting an in-phase component and a quadrature component of the received modulated symbol according to the normalization gain value;

an adder for adding the shifted values; and a rounding/clipping section for transforming the normalized LLR into the number of bits and outputting the transformed LLR to the channel decoder.

13. A method for normalizing input soft metric to a channel decoder in a wireless communication system, comprising:

generating a soft metric per bit for a received modulated symbol;

receiving the soft metric and computing a normalized log likelihood ratio (LLR) by using a modulation order of the received modulated symbol and a noise variance value to the soft metric;

transforming the normalized LLR into a number of bits; and outputting the transformed LLR to the channel decoder, wherein the outputting of the input LLR of the channel decoder comprises:
computing the noise variance value from a channel estimate of the received modulated symbol and selecting a temporary normalization index mapped to division by the noise variance value;
generating a normalization index by subtracting a constant value according to the modulation order from the selected temporary normalization index;
transforming the normalization index into a normalization gain value computed by multiplying the normalization index by a normalization coefficient;
shifting an in-phase component and a quadrature component of the received modulated symbol according to the normalization gain value;
adding the shifted values; and
transforming the normalized LLR into the number of bits and outputting the transformed LLR to the channel decoder.

14. The method of claim 13, wherein the generating of the soft metric comprises generating the soft metric using the in-phase component ($X_k$) and the quadrature component ($Y_k$) of the received modulated symbol ($R_k$), a channel fading coefficient ($g_k$) and the constant value (c) defined by the modulation order of the received modulated symbol.

15. The method of claim 13, wherein the normalized LLR is computed by multiplying the soft metric by $$4\frac{c}{\sigma_n^2},$$

where $\sigma_n^2$ is the noise variance value computed from a channel estimate of the received modulated symbol and c is the constant value defined by the modulation order of the received modulated symbol.

16. The method of claim 15, wherein the generating of the soft metric comprises generating the soft metric by:

| Condition of $I_k$ | $\Lambda(s_{k,3})$ | $\Lambda(s_{k,2})$ |
|---|---|---|
| $I_k > 2a_k$ | $2I_k - 2a_k$ | $2a_k - I_k$ |
| $0 < I_k \leq 2a_k$ | $I_k$ | $2a_k - I_k$ |
| $-2a_k < I_k \leq 0$ | $I_k$ | $I_k + 2a_k$ |
| $I_k \leq -2a_k$ | $2I_k + 2a_k$ | $I_k + 2a_k$ | and

| Condition of $I_k$ | $\Lambda(s_{k,5})$ | $\Lambda(s_{k,4})$ | $\Lambda(s_{k,3})$ |
|---|---|---|---|
| $I_k > 6a_k$ | $4I_k - 12a_k$ | $10a_k - 2I_k$ | $6a_k - I_k$ |
| $4a_k < I_k \leq 6a_k$ | $3I_k - 6a_k$ | $4a_k - I_k$ | $6a_k - I_k$ |
| $2a_k < I_k \leq 4a_k$ | $2I_k - 2a_k$ | $4a_k - I_k$ | $I_k - 2a_k$ |
| $0 < I_k \leq 2a_k$ | $I_k$ | $6a_k - 2I_k$ | $I_k - 2a_k$ |
| $-2a_k < I_k \leq 0$ | $I_k$ | $6a_k + 2I_k$ | $-I_k - 2a_k$ |
| $-4a_k < I_k \leq -2a_k$ | $2I_k + 2a_k$ | $4a_k + I_k$ | $-I_k - 2a_k$ |
| $-6a_k < I_k \leq -4a_k$ | $3I_k + 6a_k$ | $4a_k + I_k$ | $6a_k + I_k$ |
| $I_k \leq -6a_k$ | $4I_k + 12a_k$ | $10a_k + 2I_k$ | $6a_k + I_k$, | where $I_k$, $Q_k$ and $a_k$ are $|g_k|^2 X_k$, $|g_k|^2 Y_k$ and $|g_k|^2 c$, respectively, $X_k$ is at least one of the in-phase component, $Y_k$ is the quadrature component of the received modulated symbol ($R_k$), $g_k$ is a channel fading coefficient and c is the constant value defined by the modulation order of the received modulated symbol.

17. A method for normalizing input soft metric to a channel decoder in a wireless communication system, comprising:
generating a soft metric per bit for a received modulated symbol;
receiving the soft metric and computing a normalized log likelihood ratio (LLR) by multiplying the soft metric by a normalization coefficient computed by adaptive modulation and coding (AMC) information; and
transforming the normalized LLR into a number of bits and outputting the transformed LLR to the channel decoder,
wherein the outputting of the transformed LLR to the channel decoder comprises:
setting a noise variance value and a constant value according to at least one of pieces of information input from a reception controller storing the AMC information and boosting information;
receiving the noise variance value and the constant value and outputting a ratio of the constant value to the noise variance value;
outputting the normalized LLR by multiplying the soft metric by the ratio of the constant value to the noise variance value; and
outputting the transformed LLR to the channel decoder by transforming the normalized LLR into the number of bits.

18. The method of claim 17, wherein the generating of the soft metric comprises generating the soft metric using an in-phase component ($X_k$) and a quadrature component ($Y_k$) of the received modulated symbol ($R_k$), a channel fading coefficient ($g_k$) and the constant value (c) defined by a modulation order of the received modulated symbol.

19. The method of claim 17, wherein the normalized LLR is computed by multiplying the soft metric by $$4\frac{c}{\sigma_n^2},$$

where $\sigma_n^2$ is the noise variance value computed from a channel estimate of the received modulated symbol and c is the constant value defined by a modulation order of the received modulated symbol.

20. The method of claim 19, wherein the generating of the soft metric comprises generating the soft metric by:

| Condition of $I_k$ | $\Lambda(s_{k,3})$ | $\Lambda(s_{k,2})$ |
|---|---|---|
| $I_k > 2a_k$ | $2I_k - 2a_k$ | $2a_k - I_k$ |
| $0_k < I_k \leq 2a_k$ | $I_k$ | $2a_k - I_k$ |
| $-2a_k < I_k \leq 0_k$ | $I_k$ | $I_k + 2a_k$ |
| $I_k \leq -2a_k$ | $2I_k + 2a_k$ | $I_k + 2a_k$ | and

| Condition of $I_k$ | $\Lambda(s_{k,5})$ | $\Lambda(s_{k,4})$ | $\Lambda(s_{k,3})$ |
|---|---|---|---|
| $I_k > 6a_k$ | $4I_k - 12a_k$ | $10a_k - 2I_k$ | $6a_k - I_k$ |
| $4a_k < I_k \leq 6a_k$ | $3I_k - 6a_k$ | $4a_k - I_k$ | $6a_k - I_k$ |
| $2a_k < I_k \leq 4a_k$ | $2I_k - 2a_k$ | $4a_k - I_k$ | $I_k - 2a_k$ |
| $0 < I_k \leq 2a_k$ | $I_k$ | $6a_k - 2I_k$ | $I_k - 2a_k$ |
| $-2a_k < I_k \leq 0$ | $I_k$ | $6a_k + 2I_k$ | $-I_k - 2a_k$ |
| $-4a_k < I_k \leq -2a_k$ | $2I_k + 2a_k$ | $4a_k + I_k$ | $-I_k - 2a_k$ |
| $-6a_k < I_k \leq -4a_k$ | $3I_k + 6a_k$ | $4a_k + I_k$ | $6a_k + I_k$ |
| $I_k \leq -6a_k$ | $4I_k + 12a_k$ | $10a_k + 2I_k$ | $6a_k + I_k$, | where $I_k$, $Q_k$ and $a_k$ are $|g_k|^2 X_k$, $|g_k|^2 Y_k$ and $|g_k|^2 c$, respectively, $X_k$ is at least one of an in-phase component, $Y_k$ is a quadrature component of the received modulated symbol ($R_k$), $g_k$ is a channel fading coefficient and c is the constant value defined by a modulation order of the received modulated symbol.

21. The method of claim 17, wherein the AMC information comprises at least one of a modulation order, a code rate and a frame size.

22. A method for normalizing input soft metric to a channel decoder in a wireless communication system, comprising:
  generating a soft metric per bit for a received modulated symbol;
  receiving the soft metric and computing a normalized log likelihood ratio (LLR) by multiplying the soft metric by a normalization coefficient being set by a normalization index computed by adaptive modulation and coding (AMC) information; and
  transforming the normalized LLR into a number of bits and outputting the transformed LLR to the channel decoder,
  wherein the outputting of the transformed LLR to the channel decoder comprises:
  generating the normalization index in which a noise variance value and a constant value are reflected according to at least one of pieces of information input from a reception controller storing the AMC information and boosting information;
  setting the normalization coefficient mapped to the normalization index;
  outputting the normalized LLR by multiplying the soft metric by the set normalization coefficient; and
  outputting the transformed LLR to the channel decoder by transforming the normalized LLR into the number of bits.

23. A method for normalizing input soft metric to a channel decoder in a wireless communication system, comprising:
  generating a soft metric per bit for a received modulated symbol;
  receiving the soft metric and computing a normalized log likelihood ratio (LLR) by multiplying the soft metric by a normalization coefficient computed by adaptive modulation and coding (AMC) information; and
  transforming the normalized LLR into a number of bits and outputting the transformed LLR to the channel decoder,
  wherein the outputting of the transformed LLR to the channel decoder comprises:
  generating a normalization index in which a noise variance value and a constant value are reflected according to at least one of pieces of information input from a reception controller storing the AMC information and boosting information;
  transforming the normalization index into a normalization gain value by multiplying the normalization index by the normalization coefficient;
  shifting an in-phase component and a quadrature component of the received modulated symbol according to the normalization gain value;
  adding the shifted values; and
  transforming the normalized LLR into the number of bits and outputting the transformed LLR to the channel decoder.

* * * * *